Jan. 31, 1967 D. A. SMITH ETAL 3,302,117
GAIN CONTROL CIRCUIT WITH SELECTABLE ATTACK
TIME CONSTANT THAT IS INDEPENDENT
OF A FIXED DECAY TIME CONSTANT
Filed July 3, 1963
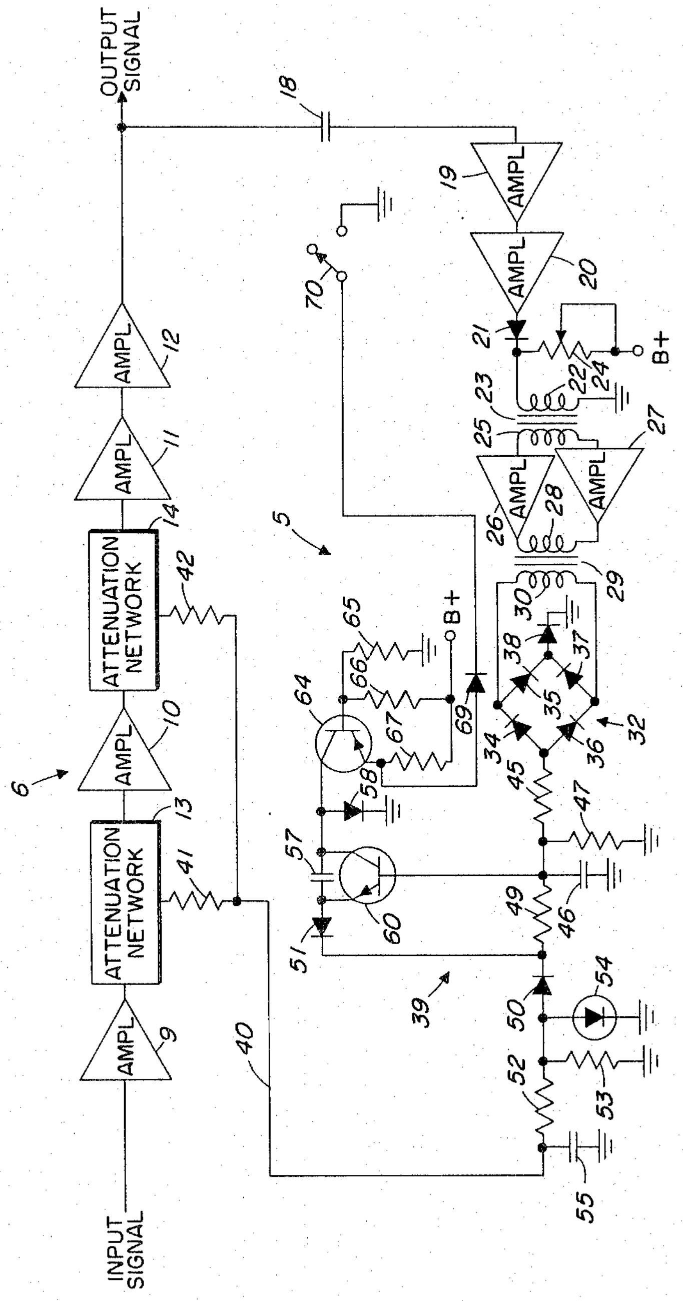
INVENTORS
DALE A. SMITH
RICHARD M. TRUESDELL
BY
Moody and Harris
ATTORNEYS United States Patent Office 3,302,117
Patented Jan. 31, 1967

3,302,117
GAIN CONTROL CIRCUIT WITH SELECTABLE ATTACK TIME CONSTANT THAT IS INDEPENDENT OF A FIXED DECAY TIME CONSTANT

Dale A. Smith, Marion, and Richard M. Truesdell, Cedar Rapids, Iowa, assignors to Collins Radio Company, Cedar Rapids, Iowa, a corporation of Iowa
Filed July 3, 1963, Ser. No. 292,688
7 Claims. (Cl. 325—410)

This invention relates to a gain control circuit and more particularly to a gain control circuit that includes means for providing a readily selectable attack time constant that is independent of a fixed decay time constant.

Automatic gain control circuits are well known in the radio transmitter and receiver art and commonly develop a degenerative feedback voltage for controlling the gain of one or more of the amplifying stages in the transmitter or receiver to be controlled. Such circuits are shown, for example, in Radio Amateur's Handbook, 40th edition, 1963, pages 101 and 102, wherein the importance of the time constant network in such a circuit is emphasized.

While the selection of components for achieving a proper time constant for specific usage in a particular automatic gain control circuit is usually fairly routine, a problem is encountered when the contemplated usage of the transmitter or receiver will not permit a single fixed time constant to be utilized in the gain control circuit. This is true, for example, where the equipment must be capable of handling both voice and data signals since the attack time constant required for optimum operation is quite different for the two types even though a common decay time is desirable.

It is an object of this invention to provide an improved gain control circuit having means providing a plurality of attack time constants, means for readily selecting a particular attack time constant, and means for providing a fixed decay time constant that is independent of the particular attack time constant selected.

More particularly, it is an object of this invention to provide a gain control circuit having a selectable attack time constant that includes a first capacitor for charging in response to an increase in the output of the device to be controlled, a second capacitor, a diode that when forward-biased causes said second capacitor to be charged along with said first capacitor, means for controlling the bias to be placed upon said diode, and discharge means connected to said second capacitor and responsive to the start of discharge of said first capacitor to rapidly discharge said second capacitor through said discharge means whereby the decay time constant of the gain control circuit is made independent of the selected attack time constant.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention constructed according to the best mode so far devised for the practical application of the principles thereof, and in which the single figure of the drawing illustrates a partial schematic diagram of the gain control circuit of this invention.

Referring now to the drawing, the gain control circuit of this invention, referred to generally by the numeral 5, receives a feedback signal from the output side of the device 6 to be controlled (from the last amplifying stage as shown in the drawing). This signal is converted to a D.C. voltage, as is conventional for automatic gain control circuits (AGC), and then coupled to the input side of one or more of the amplifying stages to thereby automatically control the gain of the device 6.

Device 6 includes one or more amplifying stages, and, as indicated in the drawing, may include four amplifying stages 9, 10, 11 and 12. To control the amplitude of the signal coupled through device 6, an attenuation network may also be connected at the input side of one or more of the amplifying stages. As indicated in the drawing, device 6 may include two attenuation networks 13 and 14 connected at the input side of amplifying stages 10 and 11, respectively, each said network also receiving the D.C. voltage from gain control circuit 5.

If desired, the D.C. voltage from the AGC circuit could be coupled directly to the amplifying stages as bias to thereby achieve the same end as achieved through the use of attenuation networks as would be obvious to one skilled in the art. This invention is therefore not meant to be limited to the use of said attenuation networks.

As shown in the drawing, the output signal from amplifying stage 12 of device 6 is coupled to gain control circuit 5 through blocking capacitor 18, conventional amplifiers 19 and 20, and delay diode 21 to input winding 22 of transformer 23. In addition, the junction of diode 21 and primary winding 22 is connected to one side of variable resistor 24, the tap of which is connected to the B+ power supply (not shown). The adjustment of variable resistor 24 acts as an automatic gain control (AGC) delay adjust circuit.

The secondary winding 25 of transformer 23 has opposite ends connected to conventional push-pull amplifiers 26 and 27, which amplifiers are connected at the output side to the opposite ends of primary winding 28 of transformer 29. The secondary winding 30 of transformer 29 is connected to opposite sides of diode bridge rectifier circuit 32 where the incoming signal is rectified to produce the required D.C. voltage.

As shown in the drawing, bridge rectifier 32 includes diodes 34, 35, 36 and 37, the cathode of diode 34 and the anode of diode 35 being connected to one side of secondary winding 30, and the cathode of diode 36 and the anode of diode 37 being connected to the other side of secondary winding 30. In addition, the cathodes of diodes 35 and 37 are connected through diode 38 to ground, while the D.C. output is taken from the junction of the anodes of diodes 34 and 36.

The D.C. output from rectifier 32 is coupled through selectable time constant circuit 39 to lead 40, which lead is connected to one side of resistors 41 and 42, the former of which has its other side connected to attenuation network 13 and the latter of which has its other side connected to attenuation network 14.

Time constant circuit 39 includes a resistor 45, one side of which is connected to rectifier 32 and the other side of whicch is connected to one side of charging capacitor 46 and one side of discharge resistor 47, each of which components is connected to ground at the other side. A resistor 49 also has one side connected to the junction of capacitor 46 and resistors 45 and 47, the other side of resistor 49 being connected to the cathodes of isolation diodes 50 and 51.

The anode of diode 50 is connected to one side of resistor 52, the other side of which resistor is connected to output lead 40. In addition, a resistor 53 and a Zener diode 54 are connected in parallel between ground and the junction of diode 50 and resistor 52, while a capacitor 55 is connected between ground and the other side of resistor 52. Resistor 53 thus serves as a discharge resistor for capacitor 55.

The anode of diode 51 is connected to one side of charging capacitor 57. The other side of capacitor 57 is connected to the anode of diode 58, the cathode of which diode is connected to ground. In addition, charging capacitor 57 has one side connected to the emitter of transistor 60, while the other side of capacitor 57 is connected to the collector of transistor 60. The base of transistor 60 is directly connected to the junction of capacitor 46 and resistors 45, 47 and 49.

The anode of diode 58 is also connected to the collector of transistor 64, the base of which is connected to the junction of resistors 65 and 66, said resistors being connected in series between the B+ power supply and ground. In addition, the emitter of transistor 64 is connected to the B+ power supply through resistor 67, and through isolation diode 69 to one pole of switch 70, the other pole of which is grounded. Switch 70 may be a manually operated switch at a remote location such as, for example, on the equipment control panel.

In operation, an operator may, by either opening or closing switch 70, select the attack time constant of the circuit for the particular purpose desired. Regardless of whether switch 70 is open or closed, however, the discharge time constant of the gain control circuit will be the same. Thus, the operator has a choice of attack time constants without effecting the decay time constant. While a selection between only two time constants is provided in the drawing, it is to be realized, however, that any number of time constants can be made available to the operator in like manner without departing from the intended scope of this invention.

If the operator wishes to provide a fast attack time constant, as would be required for optimum voice operation (optimum voice operation requiring a time constant of about eight milliseconds), for example, switch 70 is closed grounding transistor 64 to render this transistor nonconductive. Diode 58 is now reverse-biased and prevents capacitor 57 from charging therethrough along with capacitor 46. Thus, the attack time constant is determined, with respect to capacitance, only by capacitor 46.

If, however, the operator wishes to provide a slow attack time, as would be required for optimum data operation (optimum data operation requiring a time constant of about 0.2 second), for example, switch 70 is opened so that transistor 64 is in a conductive state. Since transistor 64 is now conductive, diode 58 is forward-biased to effectively place capacitor 57 in parallel with capacitor 46. The time constant is therefore determined, with respect to capacitance, both by capacitor 46 and capacitor 57.

When switch 70 is closed, capacitor 57 is never charged, as brought out hereinabove. This means, therefore, that the decay time constant is determined, with respect to capacitance, only by capacitor 46. Capacitor 46 is discharged primarily through resistor 47 and the components are chosen to provide a fixed decay time constant, which, for example, may be 0.15 second.

When switch 70 is open, however, capacitor 57 is charged along with capacitor 46. Capacitor 57, even though now charged, is nevertheless still not allowed to effect the fixed decay time constant.

This is accomplished by automatically discharging capacitor 57 through transistor 60 as soon as capacitor 46 starts to discharge. Transistor 60 is normally nonconductive so as to thereby normally present high emitter to collector impedance. However, when capacitor 46 starts to discharge, this biases transistor 60 to the conductive state (the base of transistor 60 is directly connected to capacitor 46). With transistor 60 conductive, capacitor 57 rapidly discharges through the now low emitter to collector impedance of transistor 60 thus precluding capacitor 57 from entering into the decay time constant (which will therefore still be determined by capacitor 46 discharging through resistor 47). Thus, regardless of the attack time constant selected, the decay time constant is maintained at a fixed value.

A working embodiment of the gain control circuit of this invention has been constructed utilizing the particular components listed hereinbelow. It is to be realized, however, that these components are merely illustrative and that this invention is not meant to be limited thereto. The components are as follows:

| Numeral | Component | Value or Designation |
|---|---|---|
| 18 | Capacitor | 0.02 Microfarads. |
| 21 | Diode | 1N270. |
| 24 | Variable Resistor | 0-20K Ohms. |
| 34-37 | Diodes | 1N458. |
| 38 | do | 1N816. |
| 41-42 | Resistors | 56K Ohms. |
| 45 | do | 7,500 Ohms. |
| 46 | Capacitor | 1 Microfarad. |
| 47 | Resistor | 237K Ohms. |
| 49 | do | 21.5K Ohms. |
| 50-51 | Diodes | 1N458. |
| 52 | Resistor | 34.8K Ohms. |
| 53 | do | 10 Megohms. |
| 54 | Diode | 1N719A. |
| 55 | Capacitor | 5,000 Picofarads. |
| 57 | do | 10 Microfarads. |
| 58 | Diode | 1N816. |
| 60 | Transistor | 2N718. |
| 64 | do | 2N327A. |
| 65 | Resistor | 15K Ohms. |
| 66 | do | 27K Ohms. |
| 67 | do | 2,200 Ohms. |
| 69 | Diode | 1N458. |

From the foregoing, it should be evident to those skilled in the art that this invention provides an improved gain control circuit that not only includes means providing a readily selectable charge time constant, but also provides a fixed discharge time constant that is independent of the charge time constant selected.

What is claimed as our invention is:

1. A gain control circuit of the type used to automatically control the gain of amplifying means, said circuit comprising: means adapted to receive an output from said amplifying means to be controlled; amplitude detector means for converting said output to a D.C. voltage; a first capacitor that is charged in response to an increase in said D.C. voltage from said detector means; resistance means through which said first capacitor discharges when said D.C. voltage is decreased; a second capacitor; a selectively biased diode connected to said second capacitor, switch means for controlling the bias on said diode so that said second capacitor is connected in parallel with said first capacitor and charged therewith only when said diode is forward-biased; one switch position providing a first charge time and the other switch position providing a second charge time; and discharge means connected to said second capacitor for discharging said second capacitor therethrough whenever said first capacitor starts to discharge whereby the discharge time constant to said gain control circuit is constant.

2. The gain control circuit of claim 1 wherein said switch means includes a transistor that when conductive forward-biases said diode, and a manually operated switch connected to said transistor for grounding the emitter of said transistor to render the same nonconductive.

3. The gain control circuit of claim 1 wherein said discharge means includes a transistor that is rendered conductive when said first capacitor starts to discharge, and thereafter rapidly discharges said second capacitor through said transistor.

4. A gain control circuit of the type used to automatically control the gain of amplifying means, said circuit comprising: means adapted to receive an output from said amplifying means to be controlled; amplitude detector means for converting said output to a D.C. voltage; a first capacitor that is charged in response to an increase in said D.C. voltage from said detector means; resistance means through which said first capacitor discharges when said D.C. voltage is decreased; a second capacitor; a diode connected to said second capacitor so that said second capacitor is connected in parallel with said first capacitor and charged therewith only when said diode is forward-biased; a first transistor connected to said diode to control the bias thereon, said first transistor forward-biasing said diode when said first transistor is in a conductive state; the change of bias on said diode thereby changing the charge time of said gain control circuit; a switch for rendering said first transistor nonconductive; and a second transistor connected to said second capacitor, said second transistor being rendered conductive when said first capacitor starts to discharge to thereafter rapidly discharge said second capacitor through said second transistor whereby the discharge time constant to said gain control circuit is constant.

5. A gain control circuit of the type used to automatically control the gain of amplifying means, said circuit comprising: means adapted to receive an output from said amplifying means to be controlled; a rectifier bridge circuit for converting said output to a D.C. voltage; a time constant network connected to receive the output from said bridge rectifier circuit; said time constant network including a first capacitor and resistance means through which said capacitor may be discharged; output means connected to said time constant circuit from which an output signal may be coupled to the input of said amplifying means to be controlled to thereby automatically control the gain thereof; a first diode connected to said time constant network; a second capacitor connected to said diode; a second diode connected to said capacitor, said diodes being connected so that said second capacitor is charged with said first capacitor when said second diode is forward-biased; a normally conductvie transistor having its collector connected to said second diode to normally forward-bias the same; a switch connected to the emitter of said first transistor, said switch when closed grounding the emitter of said first transistor and rendering said transistor nonconductive; operation of said switch changing the attack time of said time constant network from a first value to a second value and a second transistor having its emitter and collector connected to opposite sides of said second capacitor and its base connected to said time constant network, said second transistor being rendered conductive whenever said first capacitor starts to discharge to thereafter rapidly discharge said second capacitor therethrough whereby the discharge time constant of said circuit is constant.

6. In a gain control circuit, means providing a charge time constant that is independent of a predetermined fixed discharge time constant and is selectable between either of predetermined values, said means comprising: a first capacitor that is charged in response to an increase in D.C. voltage received by said capacitor; resistance means through which said first capacitor discharges when said received D.C. voltage is decreased; a second capacitor; a diode connected to said second capacitor so that said second capacitor is connected in parallel with said first capacitor and charged therewith only when said diode is forward-biased; means for changing the bias on said diode whereby the charge time constant of said circuit is made selectable between either of said predetermined values; and discharge means connected to said second capacitor for discharging said second capacitor through said discharge means whenever said first capacitor starts to discharge whereby the discharge time constant of said circuit is constant.

7. The means of claim 6 wherein one side of said first capacitor is grounded, wherein said resistance means is connected in parallel with said first capacitor, and wherein said one side of said second capacitor is effectively grounded through said diode when said diode is forward-biased.

References Cited by the Examiner

UNITED STATES PATENTS

| | | | |
|---|---|---|---|
| 3,154,740 | 10/1964 | Eness | 325—410 |
| 3,176,238 | 3/1965 | Dickerson | 330—141 |
| 3,226,653 | 12/1965 | Miller | 330—141 |
| 3,230,458 | 1/1966 | Strangeland | 325—410 |

KATHLEEN H. CLAFFY, *Primary Examiner.*

A. H. GESS, *Assistant Examiner.*